United States Patent
Batai

(10) Patent No.: US 7,889,859 B1
(45) Date of Patent: Feb. 15, 2011

(54) VOICE RECOGNITION FOR SERVICING CALLS BY A CALL CENTER AGENT

(75) Inventor: Jason Batai, Calgary (CA)

(73) Assignee: Avaya Inc., Basking Ridge, NJ (US)

(*) Notice: Subject to any disclaimer, the term of this patent is extended or adjusted under 35 U.S.C. 154(b) by 1661 days.

(21) Appl. No.: 10/812,265

(22) Filed: Mar. 29, 2004

(51) Int. Cl.
*H04M 3/00* (2006.01)

(52) U.S. Cl. ............... 379/266.1; 379/265.02; 379/265.03; 379/265.07

(58) Field of Classification Search ............ 379/88.01, 379/265, 265.02, 265.03, 265.07, 266.1
See application file for complete search history.

(56) References Cited

U.S. PATENT DOCUMENTS

| | | | | |
|---|---|---|---|---|
| 5,757,904 A | * | 5/1998 | Anderson | 379/265.06 |
| 5,987,115 A | * | 11/1999 | Petrunka et al. | 379/265.04 |
| 6,198,739 B1 | | 3/2001 | Neyman et al. | 370/353 |
| 6,501,832 B1 | * | 12/2002 | Saylor et al. | 379/88.04 |
| 6,542,602 B1 | * | 4/2003 | Elazar | 379/265.06 |
| 6,700,962 B1 | * | 3/2004 | Albal et al. | 379/126 |
| 6,865,258 B1 | * | 3/2005 | Polcyn | 379/88.01 |
| 2002/0035474 A1 | * | 3/2002 | Alpdemir | 704/270 |
| 2002/0038309 A1 | * | 3/2002 | Perkins et al. | 707/104.1 |
| 2002/0194047 A1 | * | 12/2002 | Edinger et al. | 705/9 |
| 2004/0008828 A1 | * | 1/2004 | Coles et al. | 379/88.01 |
| 2004/0117185 A1 | * | 6/2004 | Scarano et al. | 704/254 |

* cited by examiner

*Primary Examiner*—Ahmad Matar
*Assistant Examiner*—Khai N Nguyen
(74) *Attorney, Agent, or Firm*—David A. Dagg

(57) ABSTRACT

A system for call processing is disclosed that includes voice recognition enabled activity code support. The system operates routes a received call to an agent, based on dialed number, other caller provided information, and/or load balancing across agents. The call is then handled by the agent as appropriate. After the call is ended, the system allows the agent to describe the call using voice commands or phrases that result in one or more associated activity codes being electronically recorded in association with the call. The stored activity codes can then be used as the basis for various types of high level functions, such as report generation, customer billing, etc. Voice commands are also recognized relating to agent status. Such agent status commands may, for example, include commands indicating changes in agent status, such as when an agent logs off the system, or when the agent becomes temporarily unavailable to take calls.

23 Claims, 2 Drawing Sheets

VOICE RECOGNITION FOR SERVICING CALLS BY A CALL CENTER AGENT

FIELD OF THE INVENTION

The present invention relates generally to software applications for supporting hands free telephone services, and more specifically to a system and method for providing voice recognition enabled activity codes for a hands free call center application.

BACKGROUND OF THE INVENTION

Call centers are increasingly used to provide telephone based customer service support of many types, including sales, technical support, and others. Calls to a telephone number supported through a call center are routed by call center application software to specific individuals, referred to as "agents", that provide information, sales and/or other support relevant to each call. Call center application software operates to route received calls to appropriate agents based on agent availability, and/or information provided by the caller, such as the number dialed or caller provided voice or key pad information indicating a requested service, product type, caller's native language, etc. Using existing call center applications, call center agents are able to work in a substantially "hands free" manner, such that the agents wear headsets having a microphone and one or two speakers, and never have to use their hands to operate their phone. The call center application automatically presents calls to the agents through the headsets, and gives them break time after each call to manually write down or otherwise enter call information describing the call. After a time threshold for manually recording call information, the agent is made available for another call.

Existing call center applications include a reporting and record keeping feature known as "activity codes". Similar features are also referred to as "call pegs", or "account codes". Such features enable an agent to associate a call with one or more call categories. For example, an agent might associate a call with a "sales" activity code, a "support" activity code, or some other specific activity code, based on what happened during the call. Many specific types of information regarding a call may be encoded into an activity code, and the use of activity codes is broadly applicable. For example, activity codes may be associated with customers, and used to appropriately bill for services provided to customers through calls to the call center. When reports are generated, activity codes and other information entered by the agent, as well as caller-derived information, such as key pad data and dialed number, can be used to produce reports. Statistics can be generated based on activity codes allowing customers or service providers to determine percentages of calls or call time being used for various coded activities and/or customers. Thus, activity codes are a flexible feature, and can be used as the basis for various higher level functions. However, in existing systems, activity codes must be manually entered by agents into their telephone sets, potentially for every call they handle. This requirement of entering activity codes manually goes fundamentally against the "hand-free" nature of these call center applications, and is time consuming for the agents.

For the reasons stated above and others, it would be desirable to have a new system for handling calls to call centers that enables agents to record activity codes for calls they handle without the need for manual entry of the codes. The system should be substantially "hands-free", so that agents hands are available for other tasks.

SUMMARY OF THE INVENTION

To address the above described shortcomings and others, a system and method for call processing are disclosed that include voice recognition enabled activity code support. The disclosed system operates by routing a received call to an agent, based on dialed number, other caller provided information, agent availability and/or load balancing across agents. The call is then handled by the receiving agent. After the call is ended, the disclosed system allows the agent to describe the call using voice commands or phrases that result in one or more activity codes being electronically recorded in association with the call. The stored activity codes can then be used as the basis of various types of high level functions, such as report generation, customer billing, etc. In another aspect of the disclosed system, voice commands are also recognized that relate to agent status. Such agent status commands may, for example, include commands indicating changes in agent availability, such as when the agent logs off the system, or when the agent becomes temporarily unavailable to take calls.

Thus there is disclosed a new system for handling calls to call centers that enables agents to record activity codes for calls they handle, and agent status changes, without manual entry of codes. The disclosed system is substantially "hands-free", and agents hands are advantageously available for other tasks.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
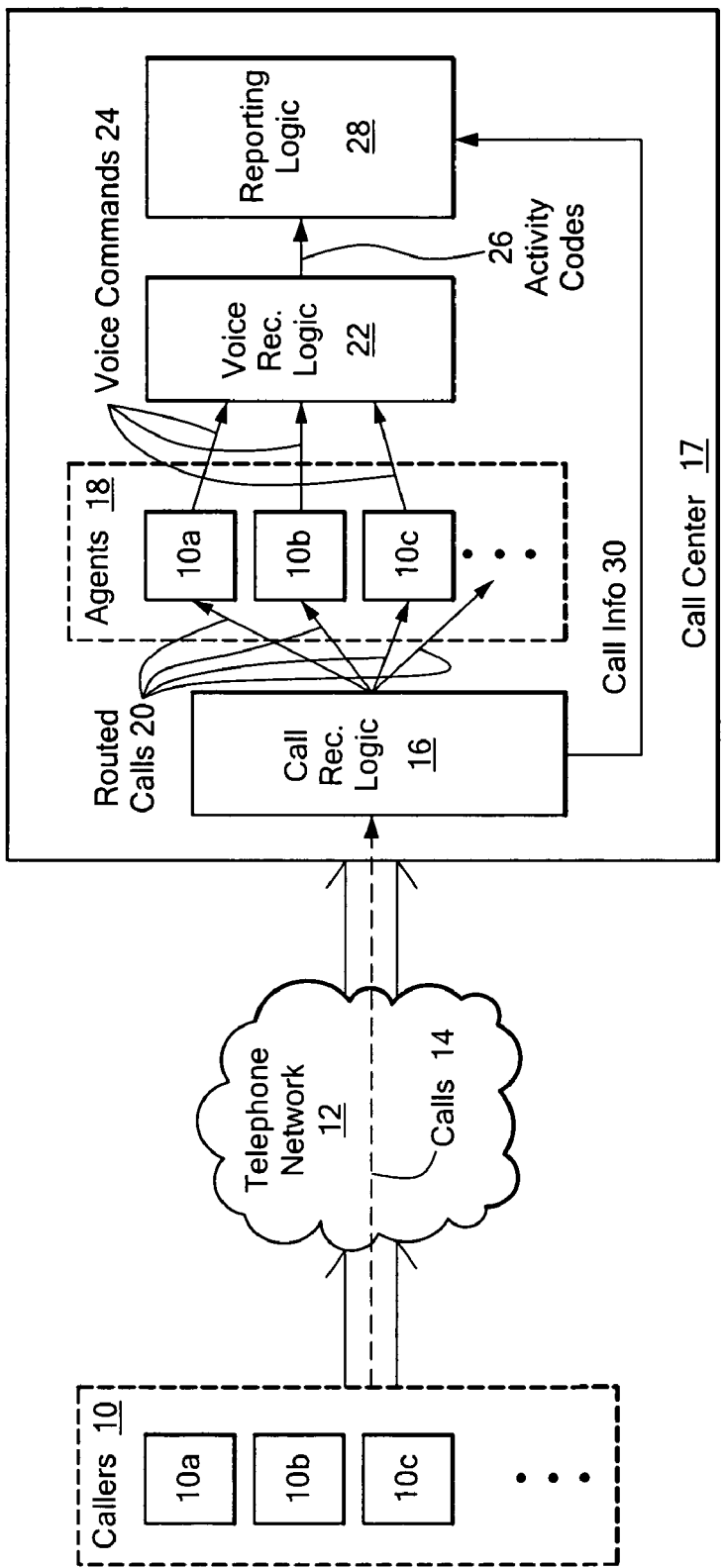
FIG. 1 is a block diagram illustrating a call center and a call processing system.

As shown in FIG. 1, in an illustrative embodiment of the disclosed system, a number of callers 10, shown including callers 10a, 10b and 10c for purposes of illustration, communicate with a call center 16 by way of a telephone network 12. The callers may use any type of calling equipment to initiate calls 14 to numbers handled by the call receiving logic 16 in the call center 17. The call center 17 is shown also including a number of call agents 18 working in the call center, shown including agents 18a, 18b, and 18c for purposes of illustration, each of which may be equipped with a telephone headset or other type of hands-free telephone equipment, such as speaker phones. The call center 17 is further shown including voice recognition logic 22 and reporting logic 28.

The call receiving logic 16, voice recognition logic 22 and reporting logic 28 may be embodied using software programs executing on one or more processors in computer systems having program storage for storing the software programs, and having some number of input/output (I/O) interfaces. Alternatively, the call receiving logic 16, voice recognition logic 22 and reporting logic 28 may be embodied using special purpose hardware components in such computer systems, or some combination of software program and hardware logic. Additionally, while the agents 18 are described for purposes of explanation as using telephone headsets or other hands-free telephone equipment, the present invention may alternatively be embodied using any other specific type of telephone devices that may be appropriate for a specific operational environment.

During operation of the components shown in FIG. 1, the call receiving logic 16 receives calls 14 from the callers 10, and sends routed calls 20 to specific ones of the agents 18. The routed calls 20 may be directed to specific ones of the agents 18 based on any specific type of criteria, such as number dialed, or caller supplied information, such as key pad entered data describing the subject of the call, the caller's language preferences, etc.

After receiving one of the routed calls 20, an agent within the agents 18 handles the call as needed. At some point after the call has been routed to an agent, either during the call or after the call has been terminated, the agent issues one or more voice commands 24 to the voice recognition logic 22. The voice commands 24 may, for example, be issued through the same telephone equipment that was used by the agent to handle the call, either hands-free or conventional, or through a separate voice receiving device (such as a microphone) dedicated to receiving voice commands. The voice recognition logic 22 generates one or more activity codes 26 in response to the voice commands 24, and these activity codes 24 are stored in data records associated with the calls they describe. For example, a database of call records associated with calls processed at the call center 17, or at some set of call centers, may be maintained through operation of the disclosed system.

The activity codes 26, together with call information 30 provided by the call receiving logic 16, may be used by the reporting logic 28 to generate reports. The call information 30 may, for example, include the number dialed by a caller to reach the call center 17, and/or other caller entered information such as keypad entered information describing the subject matter of a specific call, and/or information about the call such as time of day, duration, receiving agent identifier, etc. The activity codes 26 may encode any specific type of information for describing a call, such as whether the call was a sales call, whether a sale was completed, whether the call was a support call, the type of product for which information was provided, the identity of the customer or caller making the call, or other information. Moreover, the activity codes 26 may be associated with time periods within the call to which they relate. For example, a first activity code may be entered relating to a first portion of the call, such as a first predetermined time period of the call. Another activity code may be entered relating to a second time period of the call, and so forth. In this way, the agent has the ability to assign different activity codes to different portions of the call. Such functionality may, for example, be useful in the case where the disclosed system is deployed within a business that charges for telephone calls by time period, such as is the case within a service business such as a law firm.

The reporting logic 28 may be embodied to generate bills to clients based on the activity codes 26. In such an embodiment, call related charges for a given customer can be determined through use of an activity code associated with that customer in call records stored by the disclosed system. Such call records may in this way associate a client or customer with charges relating to product sales or services provided through calls 14.

Figure 2:
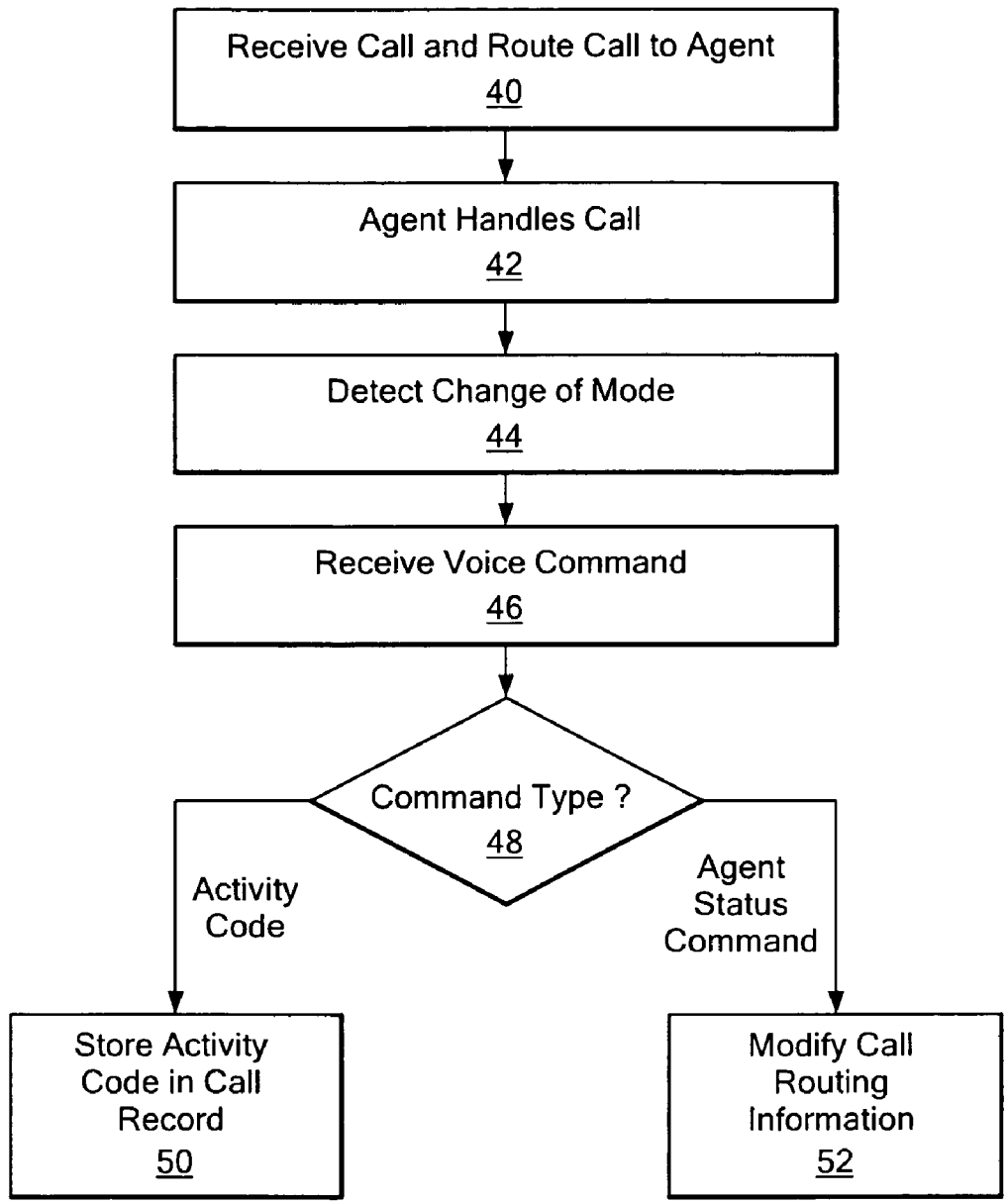
FIG. 2 is a flow chart of steps performed by an illustrative embodiment of the disclosed system.

FIG. 2 is a flow chart showing steps performed in an illustrative embodiment of the disclosed system. At step 40, a call is received at a call center, and the call is routed to an appropriate agent for handling. At step 42, the agent handles the call, providing whatever services are required by the caller. At step 44, the disclosed system detects a change of mode event indicating that a voice command relating to the received call is about to be entered. For example, the change of mode detected at step 44 may result from the call being terminated. Alternatively, some other event may trigger the change of mode detected at step 44.

Various specific events may cause a change of mode event to occur. For example, a button, toggle or any other specific type of manual interface mechanism capable of generating a detectable signal may be provided on the agent's headset to trigger a mode change. Alternatively, or in addition, the disclosed system may be embodied to monitor the entire call itself for voice commands that include activity codes or other keywords that change the mode so that activity codes can be spoken by the agent. Such mode change keywords may be configurable. The disclosed system may operate such that after one or more predetermined keywords are spoken during the call, the system enters a muted command mode in which whatever is said by the agent is recorded for activity code parsing, but the caller does not hear the agent speaking until the agent terminates the command mode with another keyword. The keywords for entering such a command mode could, for example, consist of or include the phrase "One moment please", or any other word or words depending on how the system is configured. In such an embodiment the caller would hear "One moment please" as spoken by the agent, then a period of silence, music, or other preconfigured "on hold" audio, while the agent works in the background to record one or more activity code commands. The agent can then exit the command mode, any preconfigured "on hold" audio is stopped, and the caller again hears the agent resuming normal speech.

At step 46, the agent speaks a voice command to the disclosed system. Voice recognition functionality within the disclosed system then operates to determine the type of the disclosed command at step 48. The disclosed system may be embodied to support various specific activity code voice commands, such as commands relating to sales activities, support services, specific customers, etc. For example, an agent might say "I made a sale", and the disclosed system would recognize the words as being or including a predetermined voice command, and as a result store an activity code indicating that a sale was made in a data record for the recently ended call handled by that agent. Other examples of activity code related voice commands include "service call" or a predetermined customer identification.

Additionally, the disclosed system may be embodied to support various agent status voice commands relating to the availability of the agent. Such agent status commands may include commands indicating that the agent is logging off the system, taking a break, logging on to the system, etc. For example, an agent might speak the words "Logging Off", and the disclosed system would recognize the words as containing a predetermined voice command, and as a result would store an indication that the agent is not available for taking calls. Other examples of agents status voice commands include "busy", "logging in", "log off", "log in", etc.

If at step 48 the disclosed system determines that the received voice command is an activity code command, then at step 50 the resulting activity code or codes are stored in one or more data records relating to the received call. Such data records may be stored in a database or other appropriate manner. If at step 48 the disclosed system determines that the received voice command is an agent status command, then at step 52 the disclosed system operates to modify an internal availability indication with regard to that agent reflecting the specific voice command received. For example, if the agent spoke a voice command such as "log out", the disclosed system would log the agent off the system, and stop routing calls to the agent's phone until the agent or another agent logs in. Similarly, if the agent spoke a voice command such as "break", the disclosed system would stop routing received calls to the agent's phone until the agent was again available to receive calls.

The above description of the preferred embodiments include a flowchart and a block diagram illustration of methods, apparatus (systems) and computer program products according to an embodiment of the invention. Those skilled in the art will recognize that the specific orders of steps shown in the flow chart are given purely for purposes of illustration, and that the actual order in which the described operations are performed may vary between embodiments, configurations, or based on specific operational conditions. It will be further understood that each block of the flowchart and block diagram illustrations, and combinations of blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

I claim:

1. A method, embodied in at least one computer system, for processing a received call, comprising:
   routing, by said at least computer system, the received call to an agent;
   detecting a change of mode event prior to termination of said received call, wherein said change of mode event comprises detecting a signal generated responsive to detecting an action taken by said agent;
   responsive to said detecting said change of mode event, entering a muted command mode during which a caller of said call is prevented from hearing said agent speaking;
   receiving, during said muted command mode and prior to termination of said received call, at least one call description voice command from said agent;
   storing at least one activity code associated with said at least one call description voice command in a data record associated with said received call in a database of call records associated with received calls, wherein said at least one activity code describes said received call, and wherein said activity code is associated with one of a plurality of time periods occurring during said received call, wherein said activity code is one of a plurality of activity codes stored during said received call, each of said plurality of activity codes associated with a respective one of said plurality of time periods occurring during said received call; and
   generating a report including statistics indicating percentages of call time being used for specific activities responsive to said associations between said activity codes and said time periods occurring during said received call.

2. The method of claim 1, wherein said change of mode event comprises detecting a voice command spoken by said agent prior to termination of said received call.

3. The method of claim 1, wherein said change of mode event comprises detection of a signal from a manual interface mechanism on a telephone headset associated with said agent.

4. The method of claim 1, wherein said activity code indicates that a sale occurred during said call.

5. The method if claim 1, wherein said activity code indicates an identity of said caller of said call.

6. The method of claim 1, further comprising:
   receiving an agent status voice command from said agent; and
   changing an internal status of said agent responsive to said agent status voice command, wherein said internal status determines at least in part the availability of said agent to receive calls.

7. The method of claim 6, wherein said agent status voice command indicates that said agent is logging off the system, and further comprising logging said agent off the system in response to said agent status voice command.

8. The method of claim 6, wherein said agent status voice command indicates that said agent is temporarily unavailable to receive calls, and further comprising making said agent temporarily unavailable to receive calls in response to said agent status command.

9. The method of claim 6, wherein said agent status voice command indicates that said agent is available to receive calls, and further comprising making said agent available to receive calls in response to said agent status command.

10. The method of claim 1, further comprising generating at least one report describing a plurality of received calls, wherein said report is based at least in part on said data record associated with said received call, and wherein said report reflects said activity code.

11. A computer system for processing a received call, comprising:
   a call receiving logic module for routing the received call to an agent; and
   a voice recognition logic module for
      detecting a change of mode event prior to termination of said received call, wherein said change of mode event comprises detecting a signal generated responsive to detecting an action taken by said agent, responsive to said change of mode event being detected, enteric a muted command mode during which a caller of said call is prevented from hearing said agent speaking, receiving, during said muted command mode and prior to termination of said received call, at least one call description voice command from said agent, storing at least one activity code associated with said at least one call description voice command in a data record associated with said received call in a database of call records associated with received calls, wherein said at least one activity code describes said received call, and wherein said activity code is associated with one of a plurality of time periods occurring during said received call, wherein said activity code is one of a plurality of activity codes stored during said received call, each of said plurality of activity codes associated with a respective one of said plurality of time periods occurring during said received call; and generating a report including statistics indicating percentages of call time being used for specific activities responsive to said associations between said activity codes and said time periods occurring during said received call.

12. The system of claim 11, wherein said change of mode event comprises detecting a voice command spoken by said agent prior to termination of said received call.

13. The system of claim 11, wherein said change of mode event comprises detection of a signal from a manual interface mechanism on a telephone headset associated with said agent.

14. The system of claim 11, wherein said activity code indicates that a sale occurred during said call.

15. The system of claim 11, wherein said activity code indicates an identity of said caller of said call.

16. The system of claim 11, wherein said voice recognition logic is further for:

receiving an agent status voice command from said agent; and changing an internal status of said agent responsive to said agent status voice command, wherein said internal status determines at least in part the availability of said agent to receive calls.

17. The system of claim 16, wherein said agent status voice command indicates that said agent is logging off the system, and wherein said voice recognition logic is further operable to log said agent off in response to said agent status voice command.

18. The system of claim 16, wherein said agent status voice command indicates that said agent is temporarily unavailable to receive calls, and wherein said voice recognition logic is further operable to make said agent temporarily unavailable to receive calls in response to said agent status voice command.

19. The system of claim 16, wherein said agent status voice command indicates that said agent is available to receive calls, and wherein said voice recognition logic is further operable to make said agent available to receive calls in response to said agent status voice command.

20. The system of claim 11, further comprising report logic operable to generate at least one report describing a plurality of received calls, wherein said report is based at least in part on said data record associated with said received call, and wherein said report reflects said activity code.

21. A system for processing a received call, comprising:

means for routing the received call to an agent;

means for detecting a change of mode event prior to termination of said received call, wherein said change of mode event comprises detecting a signal generated responsive to detecting an action taken by said agent;

means, responsive to said detecting said change of mode event, for entering a muted command mode during which a caller of said call is prevented from hearing said agent speaking;

means for receiving, during said muted command mode and prior to termination of said received call, at least one call description voice command from said agent;

means for storing at least one activity code associated with said at least one call description voice command in a data record associated with said received call in a database of call records associated with received calls, wherein said at least one activity code describes said received call, and wherein said activity code is associated with one of a plurality of time periods occurring during said received call, wherein said activity code is one of a plurality of activity codes stored during said received call, each of said plurality of activity codes associated with a respective one of said plurality of time periods occurring during said received call; and means for generating a report including statistics indicating percentages of call time being used for specific activities responsive to said associations between said activity codes and said time periods occurring during said received call.

22. The method of claim 1, further comprising:

generating a bill charging for said received call by time period responsive to said associations between said activity codes and said time periods occurring during said received call.

23. The system of claim 11, further comprising:

reporting logic for generating a bill charging for said received call by time period responsive to said associations between said activity codes and said time periods occurring during said received call.

* * * * *